United States Patent
Mizuno et al.

(10) Patent No.: US 7,282,079 B2
(45) Date of Patent: Oct. 16, 2007

(54) THERMAL SPRAY POWDER

(75) Inventors: Hiroaki Mizuno, Gifu (JP); Tsuyoshi Itsukaichi, Gifu (JP)

(73) Assignee: Fujimi Incorporated, Nishikasugai, Aichi (JP)

( * ) Notice: Subject to any disclaimer, the term of this patent is extended or adjusted under 35 U.S.C. 154(b) by 5 days.

(21) Appl. No.: 11/020,539

(22) Filed: Dec. 22, 2004

(65) Prior Publication Data

US 2006/0053967 A1    Mar. 16, 2006

(30) Foreign Application Priority Data

Dec. 25, 2003   (JP) ............... 2003-431620

(51) Int. Cl.
*B22F 1/00*    (2006.01)
(52) U.S. Cl. .................... 75/252; 428/570
(58) Field of Classification Search ........... 75/252; 428/570
See application file for complete search history.

(56) References Cited

U.S. PATENT DOCUMENTS

| | | | |
|---|---|---|---|
| 4,865,252 A | 9/1989 | Rotolico et al. | 239/8 |
| 4,925,626 A | 5/1990 | Anand et al. | 419/18 |
| 5,075,129 A | 12/1991 | Jackson et al. | 427/451 |
| 5,419,976 A | 5/1995 | Dulin | 428/570 |
| 5,580,833 A | 12/1996 | Fu et al. | 501/87 |
| 5,747,163 A | 5/1998 | Douglas | 428/404 |
| 5,763,106 A | 6/1998 | Blanchard et al. | 428/570 |
| 5,789,077 A | 8/1998 | Nakahama et al. | 428/336 |
| 5,928,976 A | 7/1999 | Yamamoto et al. | 501/87 |
| 6,004,372 A | 12/1999 | Quets | 75/255 |
| 6,254,704 B1 | 7/2001 | Laul et al. | 148/513 |
| 6,482,534 B2 | 11/2002 | Itsukaichi et al. | 428/569 |
| 6,641,917 B2 | 11/2003 | Itsukaichi et al. | 428/402 |

FOREIGN PATENT DOCUMENTS

| | | |
|---|---|---|
| JP | 08-060278 | 3/1996 |
| JP | 200-180331 | 6/2000 |
| JP | 2000-180331 | 6/2000 |
| JP | 2000 180331 | 6/2000 |
| JP | 2001-107833 | 4/2001 |
| JP | 2003-247084 | 9/2003 |

*Primary Examiner*—Roy King
*Assistant Examiner*—Ngoclan T. Mai
(74) *Attorney, Agent, or Firm*—Vidas, Arrett & Steinkraus

(57) ABSTRACT

A thermal spray powder includes cermet particles. Each cermet particle includes tungsten carbide particles having a mean primary particle size of 3 to 9 μm and metal particles or ceramic particles containing chrome. The mean particle size of the cermet particles is preferably from 2 to 50 μm and the compression strength of each cermet particle is preferably from 400 to 900 MPa. Such a thermal spray powder enables the formation of a thermal sprayed coating which has both excellent cavitation erosion resistance and slurry erosion resistance.

11 Claims, No Drawings

THERMAL SPRAY POWDER

BACKGROUND OF THE INVENTION

The present invention relates to a thermal spray powder used in applications for forming a thermal sprayed coating by, for example, high-velocity flame spraying, such as high-velocity oxyfuel (HVOF) spraying, or detonation flame spraying.

Cavitation erosion, which is a phenomenon resulting from shock waves and microjets and is generated by the collapse of cavitations corroding a solid surface, is a problem that occurs in fluid devices such as hydraulic turbines or pumps. In situations where the occurrence of cavitation erosion is a cause for concern, conventional measures for tackling this problem included forming the subject part from a material having excellent cavitation erosion resistance or coating the subject part with a material having excellent cavitation erosion resistance. Examples of materials known to have excellent cavitation erosion resistance include cobalt-based alloys, such as a stellite alloy, a martensite stainless steel comprising 13% chrome, and the composite materials disclosed in Japanese Laid-Open Patent Publication No. 8-60278. Examples of coatings known to have excellent cavitation erosion resistance include the coatings disclosed in Japanese Laid-Open Patent Publication Nos. 2001-107833 and 2003-247084.

However, while these conventional techniques can confer good cavitation erosion resistance, in many cases they are unable to confer sufficient resistance to wear caused by hard particles contained in a fluid (i.e. slurry erosion resistance). Furthermore, because the coatings disclosed in Japanese Laid-Open Patent Publication Nos. 2001-107833 and 2003-247084 are formed by either a plasma transfer arc process or by heating to fuse thermally-sprayed self-fluxing alloy coatings, the thermal effects against the substrate cannot be ignored.

SUMMARY OF THE INVENTION

Accordingly, it is an objective of the present invention to provide a thermal spray powder that can form a thermal sprayed coating that is superior in both cavitation erosion resistance and in slurry erosion resistance.

To achieve the foregoing and other objectives and in accordance with the purpose of the present invention, a thermal spray powder is provided. The thermal spray powder includes cermet particles, each cermet particle including tungsten carbide particles having a mean primary particle size of 3 to 9 μm and metal particles or ceramic particles containing chrome.

Other aspects and advantages of the invention will become apparent from the following description, illustrating by way of example the principles of the invention.

DETAILED DESCRIPTION OF THE PREFERRED EMBODIMENTS

A first embodiment of the present invention will now be described.

A thermal spray powder according to a first embodiment is mainly used in applications for forming a thermal sprayed coating by high-velocity flame spraying or detonation flame spraying, and is formed from cermet particles. Each cermet particle is a composite material of tungsten carbide particles and chrome-containing cobalt-based alloy particles. The mean particle size of the cermet particles is from 2 to 50 μm.

If the compression strength of each cermet particle is too low, the cavitation erosion resistance of the thermal sprayed coating formed from the thermal spray powder may deteriorate slightly. To prevent deterioration in the cavitation erosion resistance due to the compression strength being too low, the compression strength of each cermet particle is preferably 400 MPa or more, more preferably 500 MPa or more, and most preferably 600 MPa or more. On the other hand, if the compression strength of each cermet particle is too high, the cavitation erosion resistance of the thermal sprayed coating formed from the thermal spray powder may also deteriorate slightly. To prevent deterioration in the cavitation erosion resistance due to the compression strength being too high, the compression strength of each cermet particle is preferably 900 MPa or less, more preferably 800 MPa or less, and most preferably 700 MPa or less.

If the mean primary particle size of the tungsten carbide particles is below 3 μm or exceeds 9 μm, the cavitation erosion resistance of the thermal sprayed coating formed from the thermal spray powder is not good, and in many cases the slurry erosion resistance is also low. Therefore, the mean primary particle size of the tungsten carbide particles must be from 3 to 9 μm. However, even if the mean primary particle size of the tungsten carbide particles is in the range of 3 to 9 μm, when the mean primary particle size of the tungsten carbide particles is less than 4 μm, and even if less than 5 μm, the cavitation erosion resistance of the thermal sprayed coating formed from the thermal spray powder may deteriorate slightly. Thus, to prevent deterioration in the cavitation erosion resistance due to the mean primary particle size of the tungsten carbide particles being too small, the mean primary particle size of the tungsten carbide particles is preferably 4 μm or more, and more preferably 5 μm or more. When the mean primary particle size of the tungsten carbide particles exceeds 8 μm, and even if more than 7 μm, the cavitation erosion resistance of the thermal sprayed coating formed from the thermal spray powder may deteriorate slightly. Thus, to prevent deterioration in the cavitation erosion resistance due to the mean primary particle size of the tungsten carbide particles being too large, the mean primary particle size of the tungsten carbide particles is preferably 8 μm or less, and more preferably 7 μm or less.

If the amount of cobalt contained in each cermet particle is too small, the cavitation erosion resistance of the thermal sprayed coating formed from the thermal spray powder may deteriorate slightly due to the thermal sprayed coating not being very tough. To prevent deterioration in the cavitation erosion resistance due to the cobalt content being too small, the cobalt content in each cermet particle is preferably 5% by weight or more, and more preferably 7% by weight or more. On the other hand, if the amount of cobalt contained in each cermet particle is too large, the slurry erosion resistance of the thermal sprayed coating formed from the thermal spray powder may deteriorate slightly. To prevent deterioration in the slurry erosion resistance due to the cobalt content being too large, the cobalt content in each cermet particle is preferably 20% by weight or less, and more preferably 12% by weight or less.

If the amount of chrome contained in each cermet particle is too small, the slurry erosion resistance of the thermal sprayed coating formed from the thermal spray powder may deteriorate slightly. To prevent deterioration in the slurry erosion resistance due to the chrome content being too small, the chrome content in each cermet particle is preferably 1% by weight or more, and more preferably 3% by weight or more. On the other hand, if the amount of chrome contained in each cermet particle is too large, the cavitation erosion resistance of the thermal sprayed coating formed from the thermal spray powder may deteriorate slightly. To prevent deterioration in the slurry erosion resistance due to the chrome content being too large, the chrome content in each cermet particle is preferably 10% by weight or less, and more preferably 5% by weight or less.

The thermal spray powder according to the first embodiment is produced by a granulation and sintering method. During production of the thermal spray powder by a granulation and sintering method, slurry is prepared by dispersing tungsten carbide particles and chrome-containing cobalt-based alloy particles in a suitable dispersion medium. Next, a granulated powder is made by spray drying the prepared slurry using a spray granulator. The obtained granulated powder is sintered and subjected to further crushing and classifying, whereby a thermal spray powder according to the first embodiment is obtained.

A second embodiment according to the present invention will now be described.

A thermal spray powder according to a second embodiment is, in the same manner as a thermal spray powder according to the first embodiment, mainly used in applications for forming a thermal sprayed coating by high-velocity flame spraying or detonation flame spraying, and is formed from cermet particles. Each cermet particle is a composite material of tungsten carbide particles, chrome carbide particles, and metallic nickel particles. The mean particle size of the cermet particles is from 2 to 50 μm.

If the compression strength of each cermet particle is too low, the cavitation erosion resistance of the thermal sprayed coating formed from the thermal spray powder may deteriorate slightly. To prevent deterioration in the cavitation erosion resistance due to the compression strength being too low, the compression strength of each cermet particle is preferably 400 MPa or more, more preferably 500 MPa or more, and most preferably 600 MPa or more. On the other hand, if the compression strength of each cermet particle is too high, the cavitation erosion resistance of the thermal sprayed coating formed from the thermal spray powder may also deteriorate slightly. To prevent deterioration in the cavitation erosion resistance due to the compression strength being too high, the compression strength of each cermet particle is preferably 900 MPa or less, more preferably 800 MPa or less, and most preferably 700 MPa or less.

If the mean primary particle size of the tungsten carbide particles is below 3 μm or exceeds 9 μm, the cavitation erosion resistance of the thermal sprayed coating formed from the thermal spray powder is not good. Therefore, the mean primary particle size of the tungsten carbide particles must be from 3 to 9 μm. However, even if the mean primary particle size of the tungsten carbide particles is in the range of 3 to 9 μm, when the mean primary particle size of the tungsten carbide particles is less than 4 μm, and even if less than 5 μm, the cavitation erosion resistance of the thermal sprayed coating formed from the thermal spray powder may deteriorate slightly. Thus, to prevent deterioration in the cavitation erosion resistance due to the mean primary particle size of the tungsten carbide particles being too small, the mean primary particle size of the tungsten carbide particles is preferably 4 μm or more, and more preferably 5 μm or more. When the mean primary particle size of the tungsten carbide particles exceeds 8 μm, and even if more than 7 μm, the cavitation erosion resistance of the thermal sprayed coating formed from the thermal spray powder may deteriorate slightly. Thus, to prevent deterioration in the cavitation erosion resistance due to the mean primary particle size of the tungsten carbide particles being too large, the mean primary particle size of the tungsten carbide particles is preferably 8 μm or less, and more preferably 7 μm or less.

If the amount of chrome contained in each cermet particle is too small, the slurry erosion resistance of the thermal sprayed coating formed from the thermal spray powder may deteriorate slightly. To prevent deterioration in the slurry erosion resistance due to the chrome content being too small, the chrome content in each cermet particle is preferably 12% by weight or more, and more preferably 14% by weight or more. On the other hand, if the amount of chrome contained in each cermet particle is too large, the cavitation erosion resistance of the thermal sprayed coating formed from the thermal spray powder may deteriorate slightly. To prevent deterioration in the slurry erosion resistance due to the chrome content being too large, the chrome content in each cermet particle is preferably 25% by weight or less, and more preferably 20% by weight or less.

If the amount of nickel contained in each cermet particle is too small, the cavitation erosion resistance of the thermal sprayed coating formed from the thermal spray powder may deteriorate slightly. To prevent deterioration in the cavitation erosion resistance due to the nickel content being too small, the nickel content for each cermet particle is preferably 5% by weight or more. On the other hand, if the amount of nickel contained in each cermet particle is too large, the slurry erosion resistance of the thermal sprayed coating formed from the thermal spray powder may deteriorate slightly. To prevent deterioration in the slurry erosion resistance due to the nickel content being too large, the nickel content for each cermet particle is preferably 15% by weight or less.

The thermal spray powder according to the second embodiment is, in the same manner as the thermal spray powder according to the first embodiment, produced by a granulation and sintering method. However, as the raw material for the thermal spray powder, tungsten carbide particles, chrome carbide particles, and metallic nickel particles were used in place of tungsten carbide particles and chrome-containing cobalt-based alloy particles described in the first embodiment.

The illustrated embodiment has the following advantages.

Generally speaking, in a thermal sprayed coating formed by thermally spraying cermet particles, a matrix is formed from metal particles in the cermet particles, wherein ceramic particles in the cermet particles are dispersed in the matrix. As the size of the ceramic particles in the cermet particles increases, the adhesion strength (inter-particle bonding strength) among the cermet particles in the thermal sprayed coating increases as a result of a peening effect. In addition, as the size of the ceramic particles in the cermet particles increases, the contact surface area of each ceramic particle increases with respect to the matrix in the thermal sprayed coating. Therefore, a thermal sprayed coating formed from a thermal spray powder according to the first and second embodiments, whose mean primary particle size of the tungsten carbide particles is a relatively large 3 μm or more, can dramatically lessen the dropping out of ceramic particles and cermet particles from the thermal sprayed coating when shock from cavitation collapse or friction from hard particles in fluid is applied. For this reason a thermal spray powder according to the first and second embodiments enables the formation of a thermal sprayed coating to have excellent resistance both against cavitation erosion and slurry erosion.

If the mean primary particle size of the tungsten carbide particles is too small, oxidation of the tungsten carbide particles can easily occur during thermal spraying. Since oxidized tungsten carbide particles have poor adhesiveness with the matrix, inter-particle bonding strength deteriorates, which can even lead to deterioration in the cavitation erosion resistance of the thermal sprayed coating. However, because the thermal spray powder according to the first and second embodiments has a relatively large tungsten carbide particle mean primary particle size of 3 μm or more, oxidation of the tungsten carbide particles during thermal spraying is suppressed. This fact can also be thought of as a reason why a thermal sprayed coating formed from a thermal spray powder according to the first and second embodiments has excellent cavitation erosion resistance and slurry erosion resistance.

A thermal spray powder according to the first and second embodiments enables the formation of a thermal sprayed coating with high deposition efficiency (in a high thermal spray yield). The fact that at 9 μm or less, the mean primary particle size of the tungsten carbide particles contained in the thermal spray powder is not too large can be thought of as the reason for this. If the mean primary particle size of the tungsten carbide particles is too large, cermet particles blown towards the substrate during thermal spraying bounce back without adhering to the substrate. However, when the mean primary particle size of the tungsten carbide particles is 9 μm or less, deposition efficiency of the thermal spray powder is improved because rebound of the cermet particles is suppressed.

If the compression strength of the cermet particles is 400 MPa or more, not only is the cavitation erosion resistance prevented from deteriorating due to the compression strength being too low, but problems such as spitting, which results from the collapse of cermet particles, are suppressed as well.

If the compression strength of the cermet particles is 900 MPa or less, not only is the cavitation erosion resistance prevented from deteriorating due to the compression strength being too high, but the deposition efficiency of the thermal spray powder improves as a result of the cermet particles being more easily softened or fused in the thermal spray flame.

Cermet particles produced according to a granulation and sintering method possess good flowability because they have close to a spherical shape and have a relatively even grain size. Therefore, a thermal spray powder according to the first and second embodiments formed from cermet particles also possesses good flowability. In addition, cermet particles produced according to a granulation and sintering method possess a suitably easily-fusible nature, since they are porous and have a large specific surface area. Accordingly, a thermal spray powder according to the first and second embodiments formed from cermet particles also possesses a suitably easily-fusible nature, and because of this the deposition efficiency of the thermal spray powder improves.

It should be apparent to those skilled in the art that the present invention may be embodied in many other specific forms without departing from the spirit or scope of the invention. Particularly, it should be understood that the invention may be embodied in the following forms.

A thermal spray powder according to the first and second embodiments may be produced by a sintering and crushing method in place of a granulation and sintering method. In a sintering and crushing method, a compact obtained by compression-molding a mixture of ceramic particles and metal particles is sintered, and subjected to further crushing and classifying to produce the desired thermal spray powder.

The cermet particles in the thermal spray powder may be a composite material of tungsten carbide particles, chrome carbide particles, and chrome-containing cobalt-based alloy particles, or may be a composite material of tungsten carbide particles, chrome carbide particles, and metallic cobalt particles. Alternatively, the cermet particles may be a composite material of tungsten carbide particles, chrome carbide particles, and chrome-containing nickel-based alloy particles.

Examples and Comparative Examples of the present invention will now be described.

In Examples 1 to 38 and Comparative Examples 1 to 11, test pieces were prepared on which was disposed a 300 μm thick coating formed from thermal spray powder on a substrate made from stainless steel (SUS316). In Comparative Example 12, a test piece was prepared consisting of martensite stainless steel (SUS403).

Each of the thermal spray powders used in Examples 1 to 19 and Comparative Examples 1 and 2 was formed from cermet particles containing tungsten carbide, cobalt, and chrome. Each of the thermal spray powders used in Examples 20 to 38 and Comparative Examples 5 and 6 was formed from cermet particles containing tungsten carbide, chrome, and nickel. The thermal spray powder used in Comparative Example 3 was formed from cermet particles containing tungsten carbide and cobalt. The thermal spray powder used in Comparative Example 4 was formed from cermet particles containing chrome carbide, nickel, and chrome. The thermal spray powder used in Comparative Example 7 was a dialuminum trioxide powder. The thermal spray powder used in Comparative Example 8 was a dichromium trioxide powder. Each of the thermal spray powders used in Comparative Examples 9 to 11 was a cobalt-based alloy (Co-28Cr-4.5W-3Ni-3Fe-1.2C-1.1Si-1.0Mn) powder.

Tables 1 and 2 show the composition of the cermet particles contained in the respective thermal spray powders of Examples 1 to 38 and Comparative Examples 1 to 6, the mean primary particle size of the tungsten carbide particles in those cermet particles, and the compression strength of those cermet particles. Although not shown in Tables 1 and 2, the mean particle sizes of the cermet particles contained in the respective thermal spray powders were all approximately 30 μm. The compression strength of the cermet particles was calculated using the following Formula 1. The mean primary particle size of the tungsten carbide particles was measured according to the Fisher method (refer to Japanese Industry Standard (JIS) number H2116) using a Fisher subsieve sizer.

$$\delta = 2.8 \times 9.8 \times L / \pi / d^2 \qquad \text{Formula 1:}$$

In Formula 1, reference symbol δ denotes the compression strength (MPa) of the cermet particles, reference symbol L denotes the critical load (kgf), and reference symbol d denotes the mean particle size (mm) of the cermet particles. Critical load is, when the cermet particles are subjected by an indenter to a compression load which is increasing at a fixed rate, the magnitude of the compression load applied to the cermet particles at the point where the displacement magnitude of the indenter rapidly increases. Critical load was measured using a Micro Compression Tester, "MCTE-500" manufactured by Shimadzu Corporation.

In Examples 1 to 19 and Comparative Examples 1 to 3, the coatings were formed by high-velocity flame spraying. A "JP-5000" manufactured by PRAXAIR/TAFA was used as the thermal sprayer, wherein the oxygen supply rate was 870 L/min and the kerosene supply rate was 0.38 L/min. The barrel length (length of the injection nozzle) was 203 mm, the spraying distance was 380 mm, the gun movement rate (the movement rate of the injection nozzle tip during thermal spraying) was 750 mm/s, the pitch width (the movement pitch of the injection nozzle tip during thermal spraying) was 6.0 mm, and the thermal spray powder feed rate was 70 g/min.

In Examples 20 to 38 and Comparative Examples 5 and 6, the coatings were formed by high-velocity flame spraying under the same conditions as those of Examples 1 to 19 and Comparative Examples 1 to 3, except for the oxygen supply rate being changed to 893 L/min and the kerosene supply rate to 0.32 L/min.

In Comparative Example 4, the coating was formed by high-velocity flame spraying under the same conditions as those of Examples 1 to 19 and Comparative Examples 1 to 3, except for the spraying distance being changed to 355 mm.

In Comparative Examples 7 and 8, the coatings were formed by atmospheric plasma spraying (APS). An "SG-100" manufactured by PRAXAIR was used as the thermal sprayer, wherein the current was 900 A, the voltage was 36 V, the argon gas pressure was 45 MPa, the helium gas pressure was 69 MPa, the spray distance was 100 mm, the gun movement rate was 750 mm/s, the pitch width was 6.0 mm, and the thermal spraying powder feed rate was 30 g/min.

In Comparative Example 9, the coating was formed by a plasma transfer arc (PTA) process. A "THERMAL ARC WC100B" manufactured by THERMADYNE was used as the thermal sprayer, wherein the current was 160 A, the voltage was 22 V, the argon gas feed rate was 2 L/min, and the welding rate was 100 mm/min.

In Comparative Example 10, the coating was formed by atmospheric plasma spraying. A "SG-100" manufactured by PRAXAIR was used as the thermal sprayer, wherein the current was 850 A, the voltage was 32 V, the argon gas pressure was 34 MPa, the spraying distance was 100 mm, the gun movement rate was 750 mm/s, the pitch width was 6.0 mm, and the thermal spray powder feed rate was 70 g/min.

In Comparative Example 11, the coating was formed by high-velocity flame spraying under the same conditions as those of Examples 1 to 19 and Comparative Examples 1 to 3, except for the kerosene supply rate being changed to 0.33 L/min and the spraying distance to 355 mm.

The results relating to slurry erosion resistance of each of the test pieces prepared in Examples 1 to 38 and Comparative Examples 1 to 12 are shown in the column entitled "Slurry erosion resistance" of Tables 1 to 3. Slurry erosion resistance for each of the test pieces was evaluated over seven grades based on the erosion ratio obtained using the following Formula 2 when the test pieces were subjected along with a standard sample (STKM12C) to a slurry erosion test using the wet abrasion tester as disclosed in Japanese Laid-Open Patent Publication No. 2000-180331. That is, cases where the erosion ratio was less than 0.1 were evaluated as grade "1", 0.1 or more to less than 0.15 as grade "2", 0.15 or more to less than 0.2 as grade "3", 0.2 or more to less than 0.25 as grade "4", 0.25 or more to less than 0.3 as grade "5", 0.3 or more to less than 0.35 as grade "6", and 0.35 or more as grade "7".

$$E=(Ms/Ds)/(Mr/Dr) \quad \text{Formula 2:}$$

In Formula 2, reference symbol E denotes the erosion ratio, reference symbol Ms denotes the weight (g) of the test piece which decreases due to the erosion test, reference symbol Ds denotes the theoretical density (g/cm$^3$) of the test piece, reference symbol Mr denotes the weight (g) of the standard sample which decreases due to the erosion test, and reference symbol Dr denotes the theoretical density (g/cm$^3$) of the standard sample.

The results relating to cavitation erosion resistance of each of the test pieces prepared in Examples 1 to 38 and Comparative Examples 1 to 12 are shown in the column entitled "Cavitation erosion resistance" of Tables 1 to 3. Cavitation erosion resistance for each of the test pieces was evaluated over seven grades based on the erosion ratio obtained using the above-described Formula 2 when the test pieces were subjected along with a standard sample (SUS316) to a cavitation erosion test. That is, cases where the erosion ratio was less than 0.1 were evaluated as grade "1", 0.1 or more to less than 0.3 as grade "2", 0.3 or more to less than 0.5 as grade "3", 0.5 or more to less than 0.7 as grade "4", 0.7 or more to less than 0.9 as grade "5", 0.9 or more to less than 1.1 as grade "6", and 1.1 or more as grade "7".

In the cavitation erosion test a magnetostrictive oscillator was used. The magnetostrictive oscillator was equipped with a horn for amplifying the oscillations generated by the magnetostrictive oscillator. During testing, the test pieces and the standard sample were attached to the tip of the horn and immersed in distilled water having a temperature of about 20° C., in which the test pieces and standard sample were subjected for four hours to oscillations having a frequency of 18 kHz and an amplitude of 30 μm generated by the magnetostrictive oscillator. It should be noted that the test pieces had been polished until they had a coating surface roughness Ra of 0.05 μm before they were subjected to the cavitation erosion test.

TABLE 1

| | Composition of cermet particles [weight percentage] | | | Mean primary particle size of tungsten carbide particles [μm] | Compression strength of cermet particles [MPa] | Slurry erosion resistance | Cavitation erosion resistance |
|---|---|---|---|---|---|---|---|
| | WC | Co | Cr | | | | |
| EX. 1 | 86 | 10 | 4 | 6.1 | 648 | 1 | 1 |
| EX. 2 | 81 | 15 | 4 | 6.3 | 663 | 2 | 1 |
| EX. 3 | 88 | 8 | 4 | 6.0 | 635 | 1 | 2 |
| EX. 4 | 82 | 10 | 8 | 7.0 | 629 | 1 | 2 |
| EX. 5 | 88 | 10 | 2 | 5.9 | 687 | 2 | 1 |
| EX. 6 | 71 | 25 | 4 | 6.8 | 644 | 3 | 1 |
| EX. 7 | 92 | 4 | 4 | 6.0 | 658 | 1 | 3 |
| EX. 8 | 75 | 10 | 15 | 5.4 | 677 | 1 | 3 |
| EX. 9 | 89.5 | 10 | 0.5 | 5.9 | 652 | 3 | 1 |
| EX. 10 | 86 | 10 | 4 | 6.4 | 772 | 1 | 3 |
| EX. 11 | 86 | 10 | 4 | 6.5 | 560 | 1 | 3 |
| EX. 12 | 86 | 10 | 4 | 6.3 | 892 | 1 | 4 |
| EX. 13 | 86 | 10 | 4 | 6.6 | 438 | 1 | 4 |
| EX. 14 | 86 | 10 | 4 | 6.6 | 921 | 1 | 5 |
| EX. 15 | 86 | 10 | 4 | 6.1 | 333 | 1 | 5 |
| EX. 16 | 86 | 10 | 4 | 4.5 | 637 | 1 | 4 |
| EX. 17 | 86 | 10 | 4 | 7.6 | 655 | 1 | 4 |
| EX. 18 | 86 | 10 | 4 | 3.5 | 652 | 1 | 5 |
| EX. 19 | 86 | 10 | 4 | 8.6 | 667 | 1 | 5 |
| C. EX. 1 | 86 | 10 | 4 | 2.4 | 659 | 1 | 6 |
| C. EX. 2 | 86 | 10 | 4 | 10.1 | 619 | 1 | 6 |
| C. EX. 3 | 88 | 12 | — | 6.2 | 685 | 4 | 7 |
| C. EX. 4 | CrC 75 wt % + NiCr 25 wt % | | | — | 640 | 5 | 6 |

TABLE 2

| | Composition of cermet particles [weight percentage] | | | Mean primary particle size of tungsten carbide particles [μm] | Compression strength of cermet particles [MPa] | Slurry erosion resistance | Cavitation erosion resistance |
|---|---|---|---|---|---|---|---|
| | WC | Cr | Ni | | | | |
| EX. 20 | 70 | 17 | 10 | 6.2 | 648 | 1 | 2 |
| EX. 21 | 65 | 22 | 10 | 6.0 | 670 | 1 | 3 |
| EX. 22 | 75 | 13 | 10 | 6.8 | 683 | 2 | 2 |
| EX. 23 | 66 | 17 | 14 | 6.0 | 645 | 2 | 2 |
| EX. 24 | 73 | 17 | 7 | 6.0 | 660 | 1 | 3 |
| EX. 25 | 55 | 30 | 10 | 6.3 | 624 | 1 | 4 |
| EX. 26 | 80 | 8 | 10 | 6.3 | 681 | 3 | 2 |
| EX. 27 | 63 | 17 | 17 | 6.9 | 691 | 3 | 2 |
| EX. 28 | 76 | 17 | 4 | 6.1 | 613 | 1 | 4 |
| EX. 29 | 70 | 17 | 10 | 6.0 | 743 | 1 | 3 |
| EX. 30 | 70 | 17 | 10 | 6.2 | 537 | 1 | 3 |
| EX. 31 | 70 | 17 | 10 | 6.2 | 838 | 1 | 4 |
| EX. 32 | 70 | 17 | 10 | 6.8 | 448 | 1 | 4 |
| EX. 33 | 70 | 17 | 10 | 6.7 | 927 | 1 | 5 |
| EX. 34 | 70 | 17 | 10 | 6.4 | 374 | 1 | 5 |
| EX. 35 | 70 | 17 | 10 | 4.3 | 645 | 1 | 4 |
| EX. 36 | 70 | 17 | 10 | 7.7 | 664 | 1 | 4 |
| EX. 37 | 70 | 17 | 10 | 3.4 | 639 | 1 | 5 |
| EX. 38 | 70 | 17 | 10 | 8.6 | 620 | 1 | 5 |
| C. EX. 5 | 70 | 17 | 10 | 2.4 | 672 | 1 | 6 |
| C. EX. 6 | 70 | 17 | 10 | 10.0 | 681 | 1 | 6 |

TABLE 3

| | Thermal spray powder | Thermal spraying method | Slurry erosion resistance | Cavitation erosion resistance |
|---|---|---|---|---|
| C. EX. 7 | Al$_2$O$_3$ | APS | 5 | 6 |
| C. EX. 8 | Cr$_2$O$_3$ | APS | 4 | 6 |
| C. EX. 9 | Stellite | PTA | 6 | 1 |
| C. EX. 10 | Stellite | APS | 6 | 2 |
| C. EX. 11 | Stellite | HVOF | 6 | 3 |
| C. EX. 12 | SUS403 | | 7 | 6 |

The present examples and embodiments are to be considered as illustrative and not restrictive and the invention is not to be limited to the details given herein, but may be modified within the scope and equivalence of the appended claims.

The invention claimed is:

1. A thermal spray powder consisting essentially of cermet particles, each cermet particle including:
   tungsten carbide particles having a mean primary particle size of 3 to 9 μm;
   metal particles ceramic particles containing cobalt; and
   metal particles or ceramic particles containing chrome,
   wherein the cobalt content in each cermet particle is from 5 to 20% by weight and the chrome content in each cermet particle is from 3 to 5% by weight.

2. The thermal spray powder according to claim 1, wherein the mean primary particle size of the tungsten carbide particles is from 5 to 7 μm.

3. The thermal spray powder according to claim 1, wherein the mean particle size of the cermet particles is 50 μm or less.

4. The thermal spray powder according to claim 1, wherein compression strength of each cermet particle is from 400 to 900 MPa.

5. The thermal spray powder according to claim 4, wherein compression strength of each cermet particle is from 600 to 700 MPa.

6. The thermal spray powder according to claim 1, wherein the cobalt content in each cermet particle is from 7 to 12% by weight.

7. The thermal spray powder according to claim 1, wherein each cermet particle further includes metal particles or ceramic particles containing nickel.

8. The thermal spray powder according to claim 1, wherein the cermet particles are produced by a granulation and sintering method.

9. The thermal spray powder according to claim 1, wherein the thermal spray powder is used in an application for forming a thermal sprayed coating by high-velocity flame spraying or detonation flame spraying.

10. The thermal spray powder according to claim 1, wherein the cermet particles are a composite material of tungsten carbide particles, chrome carbide particles, and chrome-containing cobalt-based alloy particles.

11. The thermal spray powder according to claim 1, wherein the cermet particles are a composite material of tungsten carbide particles, chrome carbide particles, and metallic cobalt particles.

* * * * *